Sept. 8, 1959  J. L. QUINN ET AL  2,903,133
ELECTRICAL CONTROL SYSTEM FOR BUSINESS MACHINE CARD APPARATUS
Filed April 12, 1956  7 Sheets-Sheet 1

INVENTORS.
James L. Quinn
James K. Duncan
By Carlson, Pitzner, Hubbard & Wolfe
Attys.

Sept. 8, 1959 J. L. QUINN ET AL 2,903,133
ELECTRICAL CONTROL SYSTEM FOR BUSINESS MACHINE CARD APPARATUS
Filed April 12, 1956 7 Sheets-Sheet 3

INVENTORS.
James L. Quinn
James K. Duncan
By: Carlson, Pitzner, Hubbard & Wolfe
Attys.

Sept. 8, 1959  J. L. QUINN ET AL  2,903,133
ELECTRICAL CONTROL SYSTEM FOR BUSINESS MACHINE CARD APPARATUS
Filed April 12, 1956  7 Sheets-Sheet 5

INVENTORS.
James L. Quinn
James K. Duncan

Sept. 8, 1959   J. L. QUINN ET AL   2,903,133
ELECTRICAL CONTROL SYSTEM FOR BUSINESS MACHINE CARD APPARATUS
Filed April 12, 1956   7 Sheets-Sheet 6

INVENTORS.
James L. Quinn
James K. Duncan

Sept. 8, 1959   J. L. QUINN ET AL   2,903,133
ELECTRICAL CONTROL SYSTEM FOR BUSINESS MACHINE CARD APPARATUS
Filed April 12, 1956   7 Sheets-Sheet 7

INVENTORS.
James L. Quinn
James K. Duncan

United States Patent Office 2,903,133
Patented Sept. 8, 1959

2,903,133

ELECTRICAL CONTROL SYSTEM FOR BUSINESS MACHINE CARD APPARATUS

James L. Quinn, Chicago, and James K. Duncan, Park Ridge, Ill., assignors to Cummins-Chicago Corp., Chicago, Ill., a corporation of Illinois Application April 12, 1956, Serial No. 577,723

11 Claims. (Cl. 209—88)

The present invention relates to a control system for business machine card handling apparatus.

The control system has particular utility in and will be described by way of example in connection with apparatus for reconditioning business machine cards, such as punched cards and the like. Such cards sometimes become sufficiently bent, deformed or otherwise damaged as to fail to feed properly and register accurately in business machines such as sorters, readers, and computers, in which they are subsequently used. To restore the damaged cards to usable condition, they first are fed through the reconditioner wherein certain operations are performed on the cards that renew their physical characteristics so that they will feed properly through the subsequently utilized business machines. Such a reconditioner also includes means for automatically diverting "defective" cards. Defective cards are those which are faulty for some reason other than having been bent, folded or distorted and which thus cannot be restored to a usable condition by the reconditioner. For example, the "defective" cards may carry foreign objects, such as staples, pieces of gummed tape, or the like. In addition, some types of these foreign objects may damage parts of the reconditioner itself if the defective cards are permitted to complete their passage through the machine.

The general aim of the present invention is to provide an improved control system for a card handling machine and which detects and automatically diverts those of the cards that are defective. It is a related object to provide a novel control system which operates with extreme rapidity, being capable of accurate operation on cards moving at high velocities and in closely spaced succession.

It is another object of the invention to divert only defective cards while permitting closely spaced cards immediately preceding and succeeding a defective card to continue their travel through the machine. A related object is to detect defective cards and to reject the same at a point spaced along the path of the card travel from the point of detection, thus permitting successful operation at high card velocities.

A more detailed object of the invention is to detect excessive thickness of a card passing through the machine and to automatically reject the same without affecting satisfactory cards which may immediately precede or succeed the excessively thick card.

It is another object to provide an improved control system which disables the card feeding mechanism when the supply of cards in an associated supply hopper is depleted. A related object is to provide means for shutting down the machine automatically in response to depletion of the card supply, but only after a predetermined period of time sufficient to permit cards already within the machine to complete their passage therethrough.

Still another object is to make possible automatic disabling of the feed mechanism upon the occurrence of an overfull condition in a delivery hopper.

A further object of the invention is to provide a control system selectively operable to reject only "double cards," e.g., two cards stuck together or excessively thick over a large proportion of their length.

Other objects and advantages of the invention will become apparent as the following description proceeds, taken in conjunction with the accompanying drawings, in which.

While the invention has been disclosed and will be described in some detail with reference to a preferred embodiment, it is to be understood that there is no intention to thus limit the invention to such details. On the contrary, it is intended here to cover all modifications, equivalents and alternatives falling with spirit and scope of the invention as defined in the appended claims.

THE EXEMPLARY MACHINE

By way of setting the background environment for the invention, it is disclosed in connection with a business card reconditioning machine 20, that illustrated being of the type described and claimed in the copending application of Duncan et al., Serial No. 484,052, filed January 26, 1955, now Patent No. 2,857,825. In general, the machine has a frame which includes a pair of vertical mounting plates 21, 22 enclosed by side covers 23, 24a and a top cover 24 which protect the mechanism and provide a pleasing and uncluttered appearance. Mounted at the left or input end of the device (Figs. 1 and 2) is a supply hopper 25 in which the cards to be treated are placed for automatic feeding. At the right or output end is a hopper 26 into which the cards are delivered after passage through the machine. In use, a stack of cards, indicated at 30, is placed in the supply hopper 25, the cards being supported on an inclined feed plate 31. To accommodate cards of different lengths, the feed plate 31 may be adjusted vertically in a slot 31a cut laterally across a side plate 32. For the purpose of urging the cards toward a feeder mechanism, a pressure plate unit is provided having a slidable frame 34 and pressure plate 35, the frame 34 being adapted to ride in slots 36 formed in the slide plate 32.

Figure 2:
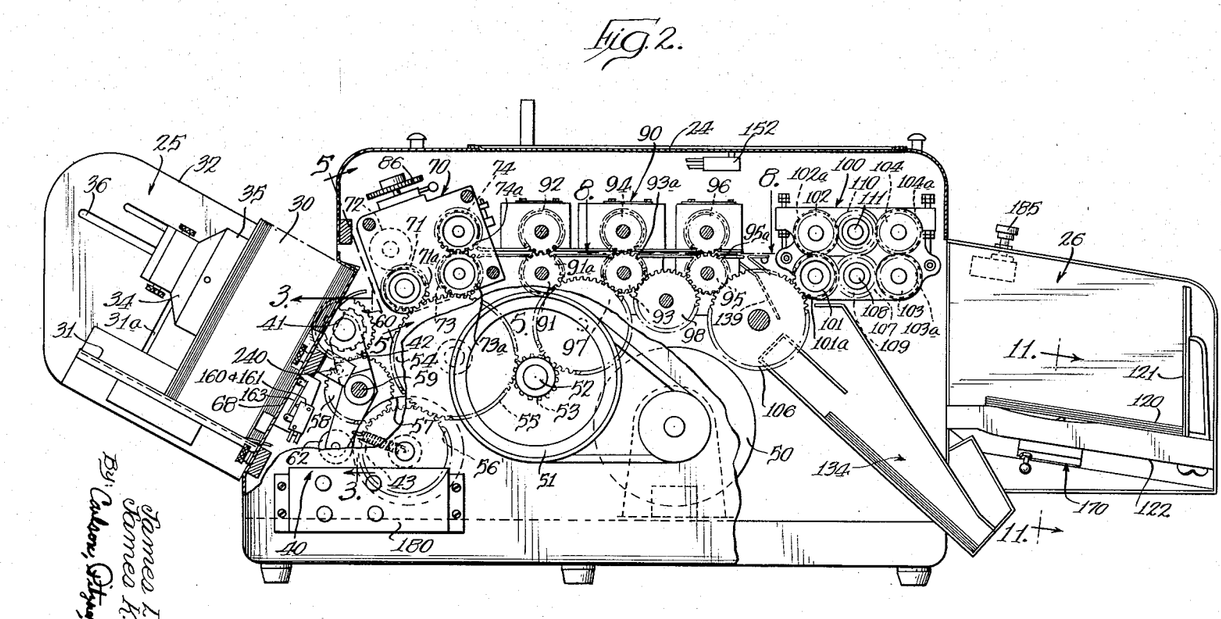
Fig. 2 is a vertical section taken substantially along the line 2—2 in Fig. 1 and showing the general organization of the reconditioner.
Figures 3, 4:
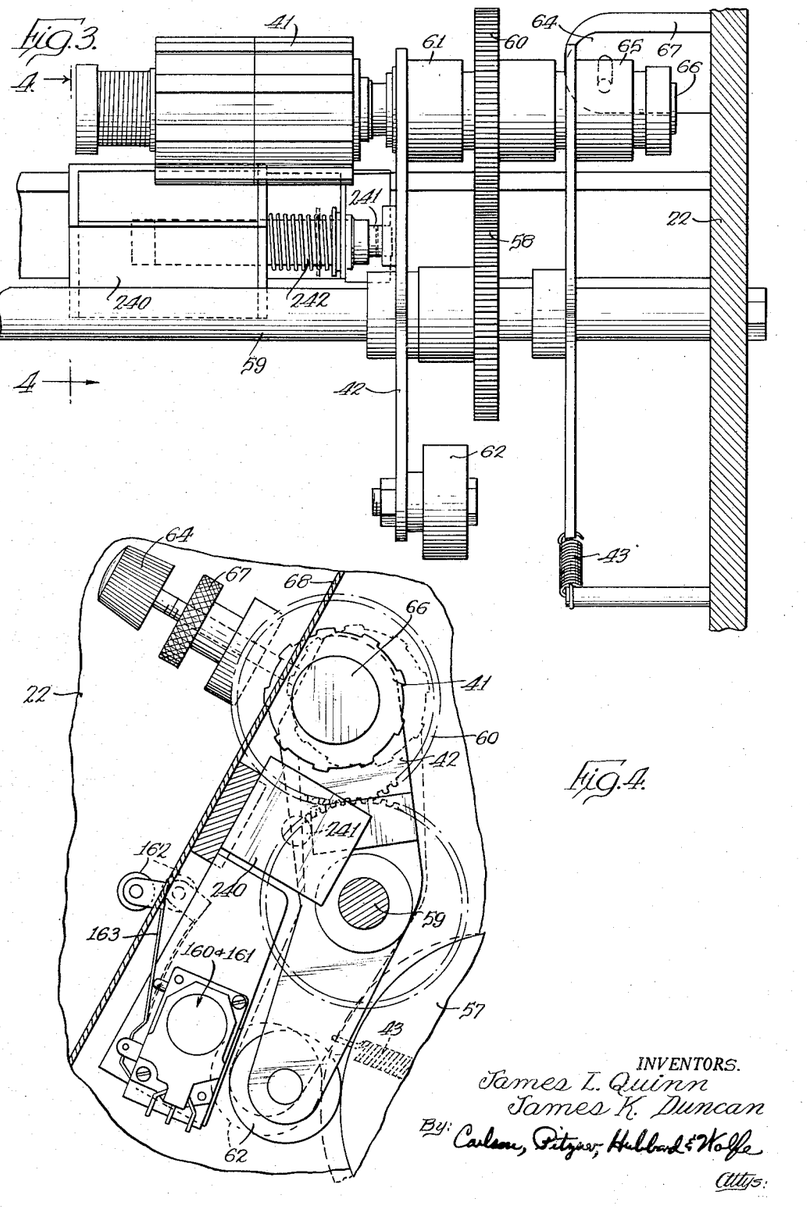
Figs. 3 and 4 are fragmentary sections taken substantially along the lines 3—3 and 4—4 in Figs. 2 and 3, respectively, and showing details of the feed mechanism.

Mounted at the bottom of feeder 25 and substantially within the machine housing is an intermittent feeding mechanism 40. Such mechanism includes a rubber feed roller 41 (Fig. 2) rotatably mounted at the end of a rocking lever 42 and normally biased toward the stack 30 by a spring 43 (Figs. 2, 3, and 4). The feed roller 41 and all other rotating components are driven by a single motor 50. Included in the driving train from the motor 50 is a speed reduction pulley 51, mounted on a cross shaft 52 having an output gear 53. The latter gear meshes with a gear 54 rigidly coupled to a gear 55. The gear 55 drives a gear 56 connected with an eccentric cam 57, the purpose of which shortly will be made clear, and drives a gear 58 on a cross shaft 59. Meshing with the gear 58 is a planetary gear 60 which is coupled to the feed roller 41 by means of an overrunning clutch 61 (Fig. 3). When the machine is in operation, therefore, the feed roller 41 is rotationally driven clockwise (Fig. 4) even though the roller is bodily oscillated with the lever 42.

Means are further provided for oscillating the feed roller lever 42 to move the feed roller 41 into and out of engagement with the lowermost card in the stack 30.

Such action is provided by a cam follower roller 62 which is located at the lower end of the lever 42 and which rides against the cam 57. The eccentricity of the cam 57 is relatively small so that the range of movement of the feed roller 41 is limited to approximately $3/16$ inch. It will be apparent that with the feed roller 41 rapidly rotating and intermittently moved forward to engage the stack of cards 30, the lowermost card will be picked up each time and fed upwardly from the supply hopper and into the machine. By choosing an oscillation rate of about 300 oscillations per minute for the feed roller and making its peripheral speed about 300 feet per minute, standard business machine cards will be spaced about 4½ inches apart and be fed through the machine at a rate of about 300 cards per minute. The delivery speed may be increased or decreased as desired simply by changing the speed change ratio of the drive from the motor 50 to the cross shaft 52, and without making any other adjustments.

To limit the movement of the roller 41 toward the bottom of the card stack 30, an adjusting screw 64 abuts at one end against the collar 65 carried on a shaft 66 which also carries the feed roller 41 (Fig. 4). The adjusting screw 64 is threaded through a flange 67 projecting inwardly from the side plate 22. Upon proper adjustment of the screw 64, the feed roller projects through a slot 68a in the supply hopper bottom plate 68 just enough to select the cards one at a time and move them off the bottom of the stack.

Centered between the frame plates 21, 22 at the output of the feed mechanism 40 is a pull roller and thickness detector unit 70 (Fig. 2). The latter includes a pair of pull rollers 71, 72, the roller 71 being driven from the gear 54 via a gear 71a. As each card is moved upwardly by the feed roller 41, its leading edge is caught between the pull rollers so that the card continues horizontally through the machine. The pull rollers may accelerate each card slightly so that it has a velocity of about 330 feet per minute at this point.

Figure 6:
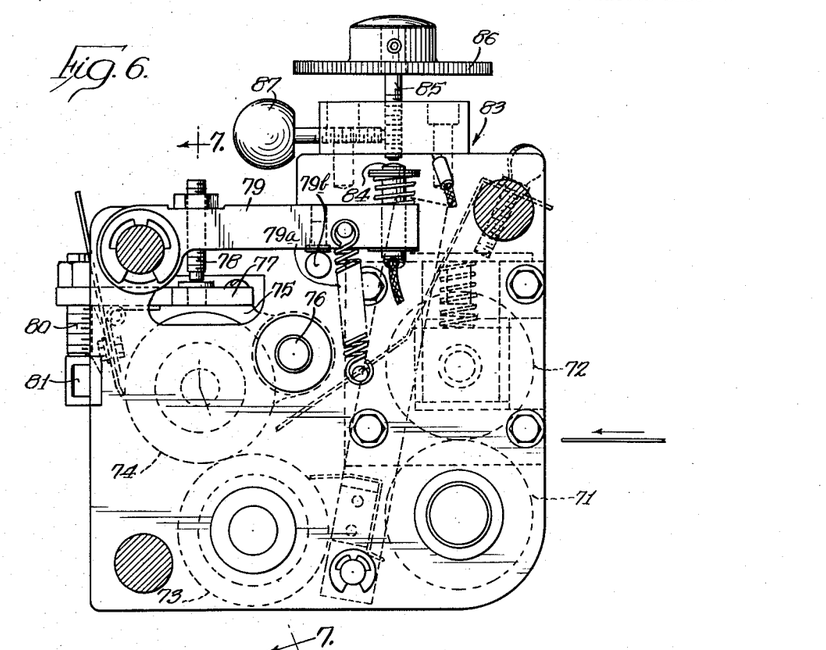
Figs. 6 and 7 are fragmentary sectional views taken substantially along the lines 6—6 and 7—7 in Figs. 5 and 6, respectively.
Figure 7:
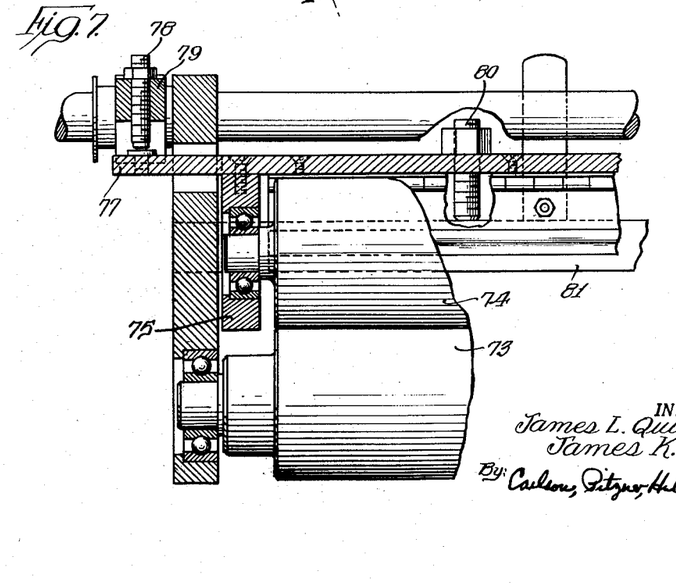

After leaving the pull rollers 71, 72 the card is passed between gauging rollers 73, 74 driven by gears 73a, 74a meshing with the gear 54 (Fig. 2). The roller 74 is mounted in the unit 70 for limited bodily movement thereby permitting it to momentarily yield or deflect when engaged by an attached staple, piece of gummed tape, or the like on a "defective" card. For this purpose the roller 74 is journaled in a sub-frame 75 pivoted on an eccentric axis 76 (Fig. 6). Coupled to the sub-frame 75 is an arm 77 which is adapted to engage a screw 78 adjustably carried by a pivoted multiplying lever 79. The lever 79 is urged clockwise against a fixed abutment stop 79b by spring 79a. The angular position of frame 75, and thus the separation of rollers 73 and 74, can be set by means of adjusting screw 80 carried thereby which abuts fixed stop 81. In a typical instance, to handle standard business machine cards having an approximate thickness of 0.0075 of an inch for example, these adjustments are made: The screw 80 is set to space rollers 73, 74 apart by a distance of about 0.005 of an inch, and then the screw 78 is set a few thousandths of an inch above arm 77. It is therefore apparent that when a "normal" card passes between rollers 73, 74 roller 74 will pivot upwardly only 0.002 or 0.003 of an inch, not enough to bring arm 77 into contact with screw 78. However, when a card having a greater thickness passes between the roll couple the additional thickness will carry arm 77 into contact with screw 78 so as to pivot multiplying lever 79 and thus actuate the switch elements discussed hereinafter.

For the purpose of electrically detecting a card having at least a portion greater than standard thickness, there is a switch 83 having contacts 84, 85, the contact 85 being positionable on a manually operated micrometer screw 86. A locking screw 87 abuts against the side of the micrometer screw for retaining the same fixed in position when once set. The circuit associated with the electrical contacts will be discussed at a later point. It will suffice for the present to say that deflection of the gauging roller 74 a predetermined amount closes the contacts 84, 85 and results in the diversion of non-standard or defective cards into a reject hopper.

For transporting the cards horizontally within the card conditioning device, a transport unit 90 is provided having rollers 91—92, 93—94, and 95—96 (Fig. 2). Each set of rollers has means for varying the bearing pressure and the rollers are rubber-faced so that the cards are transported without slipping through the roller unit. The rollers 91, 93 are driven by associated gears 91a, 93a meshing with a gear 97, the latter being driven by the gear 53. The roller 95 has a similar gear 95a, which is coupled to the gear 93a via an idler gear 98. Cards leaving the detector unit 70 are thus moved through the machine by the transport roller unit 90 in regular succession for feeding into a conditioning unit 100.

The conditioning unit 100 includes knurling rollers 101, 102 and ironing rollers 103, 104 (Fig. 2). Briefly stated, the knurling rollers are constructed and arranged to deform the card locally at closely spaced points over an extended area so as to produce a distributed, nondirectional stress pattern which serves to remove preexisting strain resulting from crushing, creasing, or the like. The ironing rollers subsequently remove the deformation imparted by the knurling rollers and restore the card to thickness, smoothness and crispness of a new card. The nature of the surfaces on the two knurling rollers and the adjustment and operation thereof are more fully described in the above-mentioned Duncan et al. application.

For the purposes of the present application, it will suffice to say that the rollers in the conditioning unit 100 are driven through a spur gear 106 which is coupled to the gear 95a associated with the roller 95 in the transport roller unit 90. The gear 106 meshes with a gear 101a mounted at the end of the roller 101. The gear 101a in turn drives a central gear 107 which meshes a gear 103a on the end of the roller 103. The central gear 107 is carried on a cross shaft 108 which has on its opposite end a drive gear 109 (behind gear 107 in Fig. 2) which in turn meshes with a gear 110 journaled on a pivot shaft 111. The gear 110 serves to drive the two upper rollers 102, 104 by means of planetary drive gears 102a, 104a respectively coupled thereto.

Spaced at the output of the conditioning unit 100 is the delivery hopper 26. Cards ejected from between the rollers 103, 104 are propelled into the hopper 26 where they fall in a stack indicated at 120, the leading edges of the cards abutting against a guide plate 121 adjustable in position longitudinally of the hopper to accommodate cards of different length. The stack 120 rests upon a bottom plate 122.

It should now be apparent that the cards travel a predetermined path in their movement through the machine 20. That is, the cards are fed successively, one at a time, from the supply hopper to the detector unit 70, through the transport unit 90, through the conditioning unit 100, and are finally deposited in the delivery hopper 26.

Attention will now be directed to the portion of this path between the transport unit 90 and the conditioning unit 100, at which point there is provided means for diverting defective cards. For initiating action of the diverting means, indicated generally at 129 (Fig. 9), the gauging contacts 84, 85 are used, in a manner to be described in detail below, to control the energization of a solenoid 130 (Fig. 9) having a plunger 131. The plunger is coupled to a card deflector in the form of a flipper 132. When the solenoid is actuated, the flipper tilts upwardly about a shaft 133 and into the path of cards leaving the transport unit 90. Thus, when a card having non-standard thickness, caused, for example, by a staple, piece of gummed tape, or the like, is detected by the unit 70, the latter provides a signal for causing the energization of the solenoid 130. That particular card is, as a result, deflected downwardly and into a reject hopper 134 (Fig. 2) so that it cannot damage the rollers in the unit 100, nor become mixed with the good cards collected in the delivery hopper. After a plurality of such cards are collected in the hopper 134, they are removed and the offending staple or tape is removed by hand. Such cards may then be re-fed through the machine 20 and reconditioned in the usual fashion.

In more detail, the solenoid plunger 131 is pulled downwardly upon energization of the solenoid and in turn pulls downwardly on a lever 135 rigid with a gear segment 136. The segment 136 meshes with a gear 137 fast on the shaft 133 to which the flipper 132 is fixed. When the solenoid 130 is de-energized, a spring 138 connected to the lever 135 returns the flipper 132 to its horizontal position where it serves as a platform between the transport unit 90 and the conditioning unit 100. Upon energization of the solenoid, moving the flipper into the raised position, an oncoming card is deflected into the lower hopper 134 by the flipper 132 and a guide plate 139 disposed thereunder. The flipper 132 is adjusted to lie normally in the horizontal position by means of an adjusting screw 140 mounted on the frame and abutting against the top side of the lever 135.

CONTROL COMPONENTS

Figure 5:
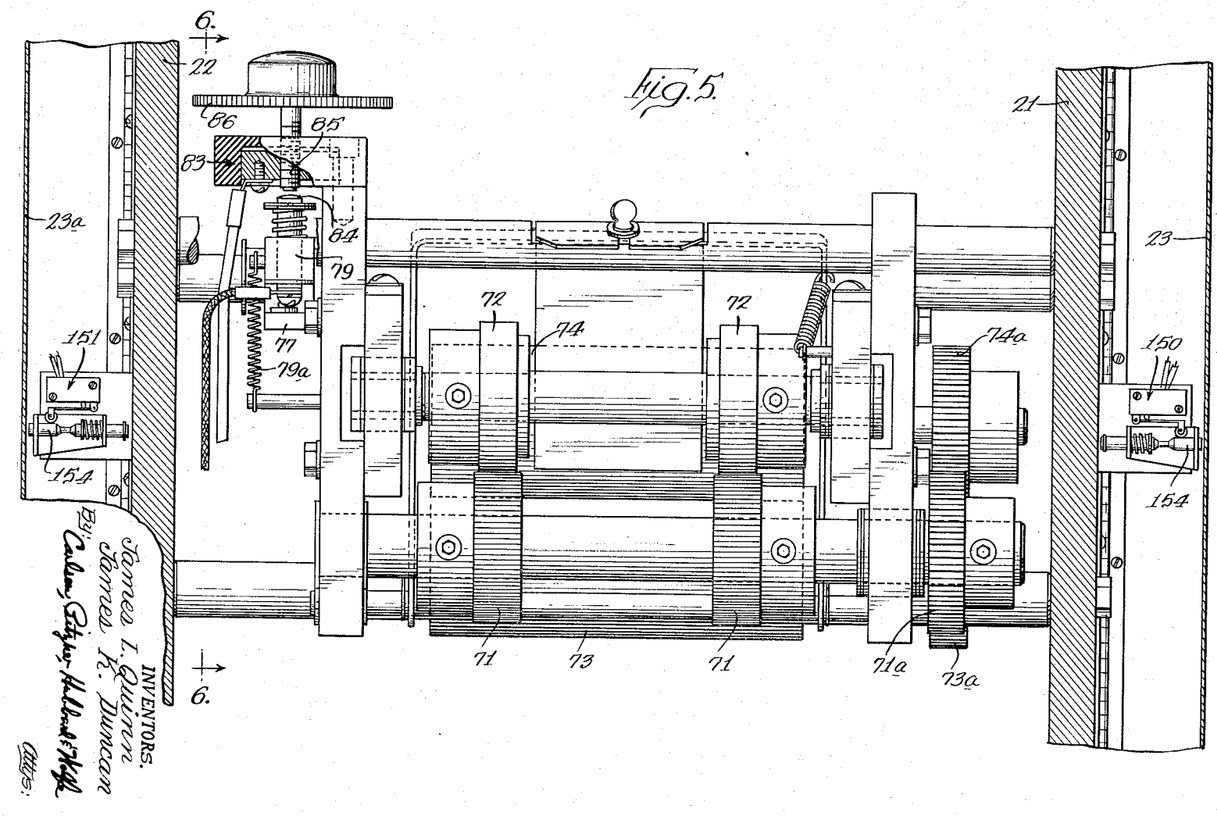
Fig. 5 is a detail view, partially in section taken along the line 5—5 in Fig. 2, showing the thickness detecting means.

Before describing the control system in detail, it will be helpful to note the physical character and location of several of the individual components thereof. For the purpose of safety to the operating personnel, interlock switches 150, 151, and 152 are associated respectively with the covers 23, 23a and 24. The side cover interlocks 150 and 151 are respectively mounted on the side plates 21 and 22 and each includes an outwardly biased plunger 154 (Fig. 5) carrying a camming surface which coacts with a switch actuator arm, the latter being biased to retain its associated switch in a normally open condition but being movable by the plunger to close the switch when the side covers are lodged in a closed position. The top cover interlock 152 (Fig. 2) is similarly biased to a normally open position, and is closed only when the top cover 24 is in place.

For providing an indication of the depletion of cards in the supply hopper 25, a pair of switches 160 and 161 are mounted below the bottom plate 68 (Fig. 4). The switches 160 and 161 may conveniently be of the "microswitch" type which are constructed and perform in a manner well known in the art. A roller 162 affixed on an actuator arm 163 is biased to protrude through a slot 164 in the plate 68. When cards are present in the supply hopper, the bottom card of the stack 30 presses the roller 162 backwardly to the surface of the plate 68 whereupon the arm 163 is deflected to close the contacts of the switch 160 and open the contacts of the switch 161, both of the switches thus being operated from the single arm 163.

Figure 12:
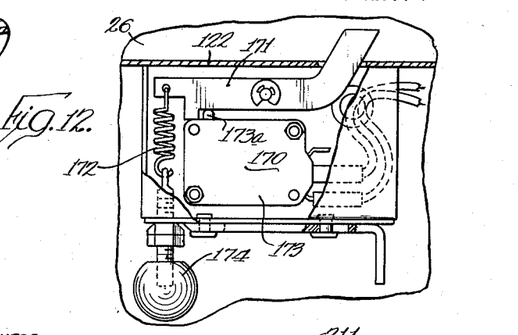

In order to indicate the occurrence of an over-fill in the delivery hopper 26, a weight-responsive switch 170 is disposed beneath the bottom plate 122 (Fig. 2). The stack 120 of delivered cards rest upon the upturned end of a lever 171 (Fig. 12), the end protruding through a slot cut in the bottom plate 122. The lever 171 is pivoted intermediate its ends and a spring 172 acts on the lever 171 to bias the same against the plunger 173a of an associated normally closed switch 173 which may be a "microswitch" type. However, when the delivery hopper 26 is filled to a predetermined level, the weight of the cards overcomes the bias of the spring 172, and the upturned end of the lever 171 is pressed downwardly, releasing the plunger 173a and opening the switch contacts. The spring 172 is anchored to an adjusting screw 174 so that total card weight required to open the switch 173 may be varied to suit cards of different sizes and densities.

Figure 1:
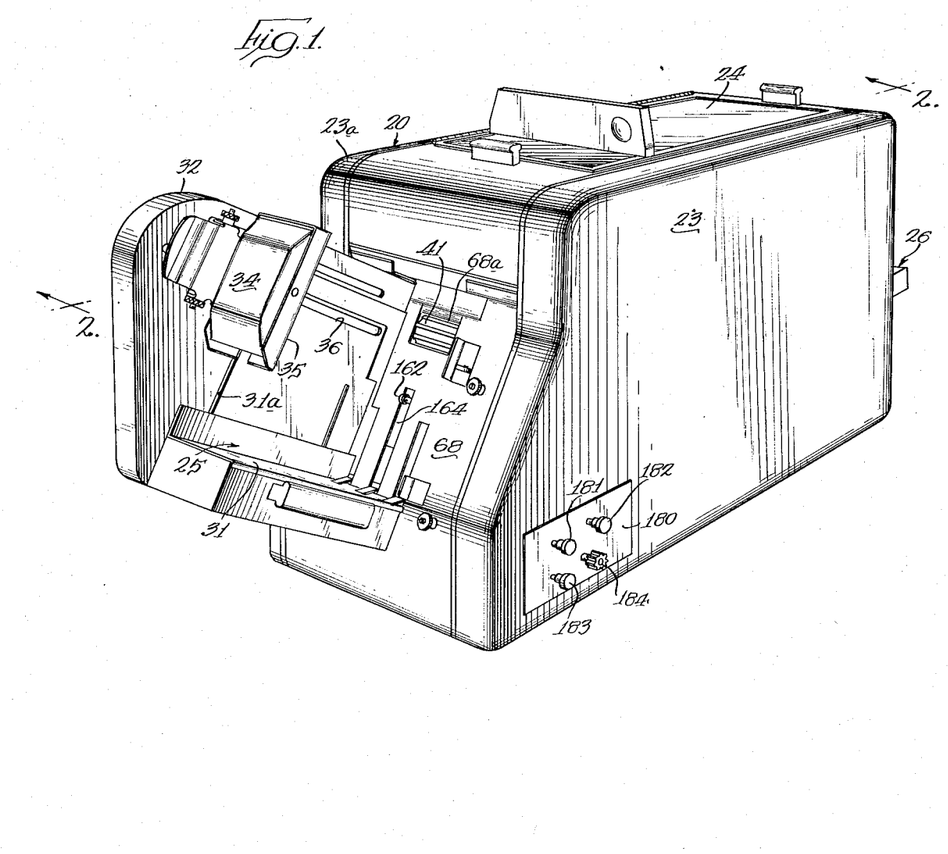
Figure 1 is a perspective view of an exemplary card handling machine, in this instance a card reconditioner, equipped with controls embodying the features of the invention.

For the convenience of the operator, a control panel 180 is exposed through the side cover 23 (Fig. 1). Projecting outwardly from the panel 180 are three push button switches. At the upper left-hand corner of the panel (Fig. 1) is a normally open "start" switch 181. To the right of the latter is a normally closed "reject control" switch 182, the purpose of which will appear later. Below the start switch 181 is a normally closed "stop" switch 183. Also on the panel 180 is a fuse holder 184 adapted to support a fuse, not shown, which is utilized to protect the elements of the control circuit in any usual manner.

On the top side of the delivery hopper 26 is the pushbutton for a normally closed "stop feed" switch 185. This switch is operable by the attendant for the purpose of stopping the feeding of cards from the supply hopper during the removal of cards from the delivery hopper.

THE PROBLEM AND SOLUTION IN GENERAL

Because cards move through the machine 20 at high velocities, the defect detector unit 70 and the diverter unit 129 must necessarily be spaced apart along the card path. At any given instant, therefore, it is likely that a given card will be opposite the diverter unit 129 while a succeeding card is in the detector unit 70. If the latter card is defective, the diverter cannot be instantaneously actuated in response to closure of the contacts 84, 85 because that would reject the preceding card; and to reject the defective card, the diverter must be actuated only after the preceding card has cleared the diverter and at an instant when the defective card has already cleared the detector unit. The diverter must remain actuated until the defective card is rejected, yet must be restored in time to pass a succeeding good card. Finally, provision must be made to hold the diverter actuated to reject two or more defective cards in succession.

In accordance with the present invention, these difficulties are solved by the provision of sensing means intermediate the detector unit 70 and the diverter unit 129. Provision is made to "store" the detection of a defective card and to actuate the diverter only after the sensing means indicate it is certain that the preceding card will be clear of the diverter. Means are also utilized to hold the diverter actuated and to prevent its restoration until the sensing means indicate that the defective card will be routed to the reject hopper. And further, provision is made through the sensing means to "re-set" the storage means promptly in order that two or more defective cards in succession will be properly diverted.

SENSING MEANS

In keeping with the invention, means are spaced along the path between the detector 70 and the diverting means 129 for sensing the presence of passing cards and which coact with the detector and diverting means to effect actuation of the latter in a manner whereby only those cards determined to be defective by the detector are diverted while all other cards are afforded normal passage on into the conditioning unit 100.

To this end, three card presence sensing units 190, 191, 192 are adapted to be sequentially actuated during the passage of a card, such units being spaced apart from one another and a short distance ahead of the flipper 132. Referring to Fig. 2, the three units are disposed along the path in the vicinity of the transport rollers 95, 96; however, as viewed in detail in Figs. 8 and 9, their actuating fingers are slightly staggered along the path so as to be actuated and released in sequence by each oncoming card.

Figure 8:
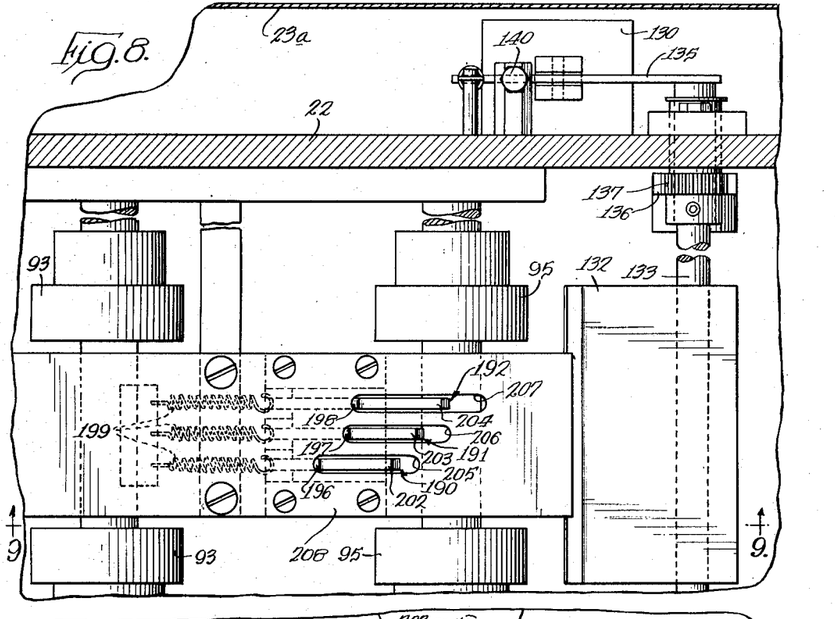
Fig. 8 is a detail view, partially in section along the line 8—8 in Fig. 2, showing sequence sensing means.
Figures 9, 10:
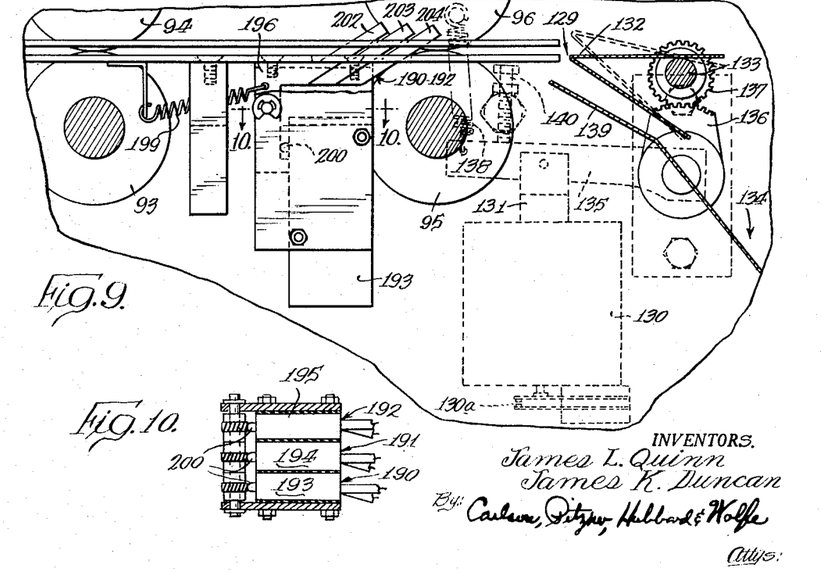
Figs. 9 and 10 are fragmentary sectional views taken substantially along the lines 9—9 and 10—10 in Figs. 8 and 9, respectively.
Figure 11:
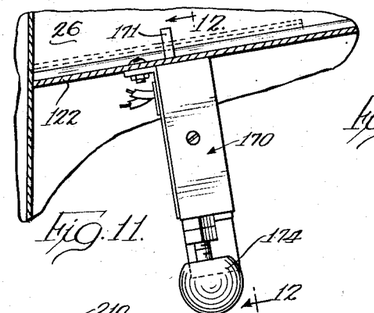
Figs. 11 and 12 are fragmentary sectional views taken substantially along the lines 11—11 and 12—12 in Figs. 2 and 11, respectively, showing details of sensing means in the delivery hopper.

As here shown, the individual card presence sensing means 190, 191, 192 include switches 193, 194 and 195 actuated by feeler arms 196, 197, 198, respectively (Figs. 8 and 9). It is convenient, although obviously not necessary, to employ switches of the "microswitch" type. The feeler arms are biased by springs 199 in a direction as to urge one end of each of the arms against the respective switch plungers 200, holding the latter normally depressed. The other feeler arm ends respectively 202, 203 and 204 are turned upwardly to protrude through respective slots 205, 206 and 207 cut through a bottom plate 208 forming the floor of the passage through the transport unit 90. The switch 193 is provided with two sets of contacts, one set 193a being normally closed and a second set 193b (Fig. 13) being normally open. The switch 194 is provided with normally closed contacts, while the switch 195 is provided with normally open contacts. The term "normally" refers to the condition of switch contacts when there is no engagement between a passing card and the respective switch-controlling feeler arm.

Sequential actuation or sensing by the feeler arms is occasioned upon the passage of a card as it moves from left to right in Figs. 8 and 9, the feeler arms being spaced along the card path in a direction from the detector unit 70 toward the diverter 132 in the numbered order, that is, the leading edge of a passing card first actuates the switch 193, then switch 194, and finally switch 195. The trailing edge of a passing card will permit restoration of the switches in the same order. With the card speed of about 330 feet per minute and with approximately 4½ inch spacing between successive cards, spacing of approximately 5/16 of an inch between each of the upturned arm ends 202—204 has been found satisfactory. It has been found that there should be a time interval of about three milliseconds between the operation of the second and third switches 194, 195, because of the inherent reset time of parts of the control circuit. This time may vary in accordance with the operating speed and inertia of the particular commercial components employed.

CONTROL CIRCUIT AND OPERATION

Figure 13:
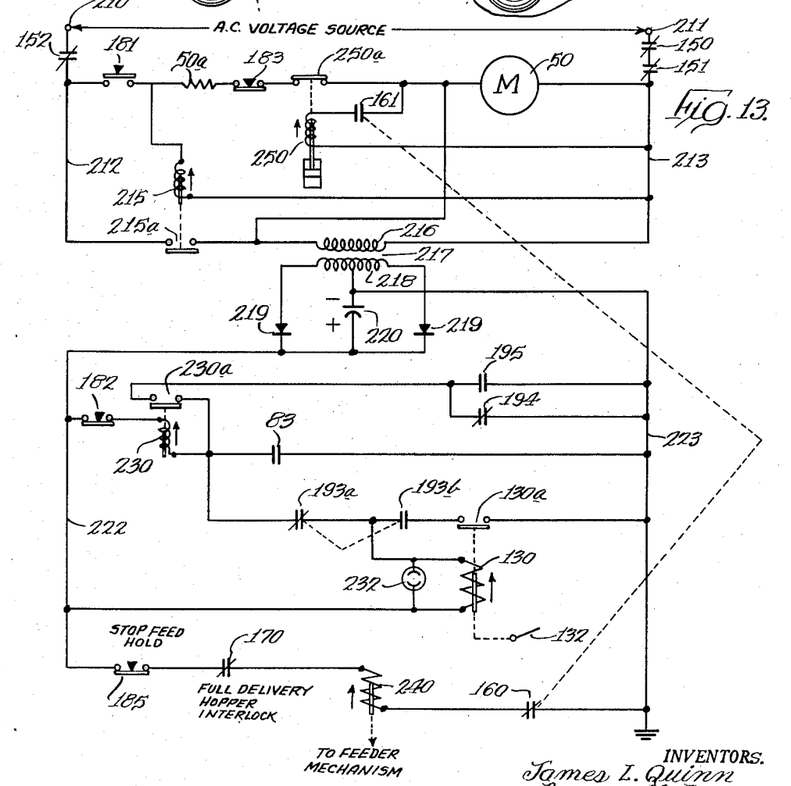
Fig. 13 is a schematic electric wiring diagram of the control system.

Turning now to the schematic diagram in Fig. 13, power is supplied to the entire circuit from a conventional alternating current voltage source connected to the terminals 210, 211. With the side and top covers 23, 23a, and 24 (Fig. 1) in place, the interlock switches 150—152 are closed to apply the source voltage across the main power lines 212, 213. To start the machine, the operator places a stack of cards in the supply hopper 25 and momentarily depresses the "start" switch 181 which energizes the drive motor 50 through a circuit including a current limiting resistor 50a, the normally closed stop switch 183 and the normally closed contacts 250a of a time delay relay 250. Closure of the start switch 181 also energizes the coil of a main power relay 215 to effect closure of its contacts 215a thus completing a sealing circuit shunting the start switch 181. Thus, upon release of the start switch, energization of relay 215 is maintained by a sealing circuit including the contacts 215a, the contacts 250a, and the stop switch 183. The motor 50 is also maintained energized by the relay contacts 215a. These energization circuits remain complete until the operator depresses the stop switch 183, or until the time delay relay contacts 250a open.

Closure of the relay contacts 215a also energizes the primary winding 216 of a transformer 217. The transformer secondary winding 218 feeds a full wave rectifier including a pair of diodes 219 and a filter condenser 220, the rectifier supplying uni-directional voltage across control circuit power lines 222, 223.

With the machine thus placed in operation, the cards normally pass one at a time in succession from the supply hopper 25 through the machine and will continue so to do until the detector unit 70 is momentarily actuated in response to the passage of a card having a portion unduly thick, caused by a staple, a piece of gummed tape, or other defect. The presence of such a defective card in the detector unit lifts the movable roller 74 and closes the switch 83 (Fig. 6) to effect energization of a control relay 230 (Fig. 13) through the normally closed "reject control" switch 182. It is the actuation of the thickness detector switch 83 that provides the key control signal upon which the sensing switches 193–195 rely and which enables the latter to in turn perform their function of controlling the operation of the flipper 132 so as to reject only defective cards.

In the operation next to be described, the control relay 230 serves as a "storage" link or means between the detector switch 83 and the sensing switches 193—195. Before describing the actual sequence of events, it may be helpful to note the general circuit arrangement. Normally open contacts 230a of the control relay 230 are connected between one side of the relay coil and the parallel switches 194 and 195 leading the supply line 223. Energization of the relay 230 through the switch 83 is effective to close a sealing circuit for the relay when either of the sensing switches, 194, 195 is closed. A sealing circuit is also provided for the flipper solenoid 130 through the feeler switch contacts 193b and solenoid contacts 130a closed upon energization of the solenoid. Initial energization of the solenoid 130, to raise the flipper 132, may be effected by way of the normally closed switch contacts 193a through either the thickness detector switch 83 or through the sealing circuit for the relay 230 by way of the other sensing switches 194 and 195. A neon discharge device 232 connected across the diverter solenoid 130 prevents arcing across the contacts 193b when the latter open.

*Case I.—Good, defective, and good cards in sequence*

Assume that a good card followed by a defective card and another good card pass through the machine. The first good card will, of course, leave the detector unit 70 and the switch contacts unaffected; it will, however, overlie the feeler arms 202—204 and actuate the sensing switches 193—195 at the time that the following defective card is in the detector unit.

The defective card first causes momentary closure of the detector switch 83, which thus energizes the storage relay 230, the latter sealing in through its own contacts 230a and the feeler switch 195 (actuated by the preceding card). Thus even though the switch 83 is closed but a brief instant and the defective card subsequently leaves the detector unit, the relay 230 will remain energized to "store" the detected defect. The solenoid 130 is not, as yet, energized because the preceding card is at this time holding the switch 193 actuated and the contacts 193a open. The sensing switch 193, therefore, serves as a delay means to prevent energization of the flipper solenoid 130 until the preceding good card has progressed far enough so that it will not be rejected, i.e., until its trailing edge releases the feeler arm 202 and restores the switch 193.

Shortly after the relay 230 is sealed in, the trailing edge of the preceding good card leaves the feeler arm 202, permitting the contacts 193b to re-open and the contacts 193a to reclose. The latter contacts thus complete an energizing circuit for the solenoid 130 (through contacts 230a and 195). Even though the trailing edge of the preceding good card almost immediately leaves the feeler arms 203 and 204 to restore the switches 194 and 195, the relay 230 and solenoid 130 remain energized at this time because the contacts 194 reclose before the contacts 195 re-open.

As the solenoid 130 is energized, it raises the flipper 132 and closes its own contacts 130a. The preceding good card had passed the flipper 132 before the latter was raised.

Now after the solenoid 130 is energized, the leading edge of the defective card strikes the feeler arm 202 and actuates the switch 193. The contacts 193b close to complete a sealing circuit through the contacts 130a for the solenoid 130. The contacts 193a open to disconnect the solenoid 130 from the switch 83 and the relay sealing circuit. Accordingly, the flipper 132 remains raised, waiting to deflect the defective card.

Next, the leading edge of the defective card strikes the arm 203 and actuates the switch 194, opening the latter. Since the contacts 195 are at this instant open, the relay sealing circuit is broken and the relay 230 drops out. Very shortly thereafter the switch 195 is actuated, but this produces no immediate effect, except to place the sealing circuit in readiness to seal in the relay 130 should the contact 83 be closed again.

The leading edge of the defective card thus progresses until it strikes the raised flipper 132 and is diverted into the reject hopper. By the time that the trailing edge of the defective card leaves the feeler arm 202, the card has progressed sufficiently that it will be entirely diverted even though the solenoid 130 is at this time de-energized, owing to the inherent inertia of the solenoid.

When the trailing edge of the defective card does release the arm 202, the switch 193 is restored; the contacts 193b thus open to break the solenoid sealing circuit, de-energizing the solenoid 130 and causing the flipper 132 to be returned to its normal position.

The following good card thus passes over the flipper 132 and through the machine.

*Case II.—Two defective cards in succession*

The operation of the control system upon the occurrence of two defective cards in immediate succession will next be described. As explained above, a preceding defective card causes the movement of the flipper 132 into its raised position where it is effective to reject this card. When the flipper solenoid 130 is energized, it seals in through contacts 193b and 130a as soon as the defective card reaches the feeler arm 202; the control relay 230 is, however, de-energized in response to the card striking the arm 203 and opening the contacts 194. Then, when the card strikes the arm 204 and closes contacts 195, an auxiliary seal-in circuit is placed in readiness so that relay 230 will pick up and seal in if the contacts 83 close again while the card is overlying the arms 202—204. Thus, even if a first defective card is overlying the feeler arms 202—204 while a second defective card is in the detector unit 70, closure of the detector switch 83 causes the control relay 230 to be picked up and sealed in as before. If there is close spacing between the two successive defective cards, the control relay 230 will have closed its contacts 230a prior to the clearance of the preceding card off the first arm 202 and the opening of the contacts 130a, so that when the preceding card clears the arm 202, the solenoid 130 will remain energized through the contacts 193b. The flipper 132 thus remains in the raised position as both of the two successive cards pass, deflecting both of them into the reject hopper.

It should be noted at this point that the spacing of the detector unit 70 from the first feeler arm 202, the speed of the cards, and the spacing between the individual successive cards, is selected so that, with respect to any two successive cards, the second card does not enter between the detecting rollers 73, 74 until the leading edge of the first card has engaged with the third feeler arm 204 to effect closure of the switch 195. It is only after the closure of this latter switch that control relay 230 is in readiness to operate and seal in upon the actuation of the detector unit 70. The sealing circuit for the control relay is broken just prior to this instant when the leading edge of the first card causes opening of the second feeler switch 194.

OPTIONAL OPERATION FOR REJECTING DOUBLE CARDS

At times, the operator may desire to prevent operation of the flipper 132 in response to the detection of cards having defects which otherwise cause rejection, while at the same time retaining part of the control system operation for the purpose of rejecting cards of excessive thickness throughout their entire length. In other words, it may be desired to reject cards defective in a special way, e.g., two or more cards are stuck together.

To achieve this mode of operation, the operator merely depresses the "reject control" switch 182 which breaks the energization circuit of the control relay 230. This removes any possibility of completion of the energization circuit for the solenoid 130 via the control relay sealing circuit, i.e., contacts 230a and contacts 194 or 195. For the purpose of effecting this mode of operation, the detector unit 70 is spaced from the first arm end 202 by a distance approximating that of the length of the cards or less. Thus, a double card in passing between the detecting rollers 73, 74 causes closure of the detector switch 83 during the entire time of travel of the double card through the rollers. Therefore, as soon as the double card enters the detector rollers 73, 74, the switch 83 is closed; and as soon as the trailing edge of the preceding card leaves the arm 202, the solenoid 130 is energized via the first feeler switch contact 193a and the detector switch 83. This raises the flipper 132 into the reject position. Then, as soon as the leading edge of the double card strikes the arm 202, the switch contacts 193a, 193b are actuated, so that the solenoid 130 is sealed in through contacts 193b and 130a. This occurs before the double card has left the thickness rollers and permitted the detector switch 83 to open and break the energization circuit of the solenoid 130. In practice, the distance between the detecting rollers 73, 74 and the switch arm 202 may be slightly greater than the length of the card because of the speed of the card coupled with the inertia in the solenoid 130. In all other respects, particularly as to the relationship of the double card to preceding and succeeding single cards, the first feeler switch 193 functions as in the above examples to prevent rejection of other than the detected defective card.

CONTROL OF FEEDING MECHANISM

Means are also provided in the system for controlling the operation of the feeder mechanism 40. This means is effective to disable the feeding mechanism 40 upon depletion of the card supply in the hopper 25 while maintaining the operation of the remainder of the machine until the last card has passed completely through the machine. To this end, a solenoid 240 (Figs. 3 and 4) is mounted beneath the supply hopper bottom plate 68 in a position to project its armature 241 into the path of the oscillating lever 42. When the solenoid 240 is deenergized, the armature 241 is biased by a spring 242 to abut against the lever and thereby prevent the spring 43 from holding the follower 62 against the eccentric cam 57. The feed roller 41 is thus withheld from moving through the plate 68 and into contact with the bottom card in the stack 30. By holding the feed roller 41 inactive after the feeding of the last card from the hopper 25, engagement between the roller and the pressure plate 35 is prevented, thus reducing wear and chance of damage to the roller.

In the control circuit (Fig. 13), the feeder solenoid 240 is connected across the lines 222, 223 in series with the normally closed "stop-feed" switch 185, the normally closed weight-operated delivery hopper interlock switch 170, and the normally closed supply hopper switch 160. Thus, the solenoid 240 is normally energized to withdraw its armature 241 out of the path of the oscillating lever 42. Upon depletion of the cards in the supply hopper 25, the switch arm 163 pops outwardly (Fig. 4), opening the contacts of the switch 160 (Fig. 13). This in turn de-energizes the feeder solenoid 240 whereupon the armature 241 is urged by the spring 242 into abutment with the lever 42 thereby disabling the feeder mechanism. At the same time, the movement of the arm 163 effects closure of the associated switch 161, which thus completes an energization path for the coil of the time delay relay 250. As previously noted, the time delay relay contacts 250a are in series with the sealing circuit for the main power relay 215. After a period of time sufficient for the last card to pass all of the way through the machine and reach either the delivery hopper 26 or the reject hopper 134, the time delay relay contacts 250a open, breaking the sealing circuit, and de-energizing the main power relay 215. This not only de-energizes the drive motor 50, but it also completely de-energizes all of the control circuitry by virtue of the opening of the contacts 215a. Thus it is impossible to again restart the machine or re-energize the control system until the operator depresses the start switch 181 after placing a fresh stack of cards into the supply hopper 25.

Improved performance and utility are also obtained by virtue of the operation of the delivery hopper interlock 170. Upon the occurrence of an over-full condition in the delivery hopper, the contacts of this switch open de-energizing the feeder solenoid 240 (Fig. 13), whereupon the feeder mechanism is disabled until the operator removes all or part of the delivered cards. In addition, should the operator at any time desire to remove cards from the delivery hopper 26 without shutting down the machine, he may depress the stop-feed switch 185 (Fig. 13) which similarly de-energizes the solenoid 240, disabling the feeder mechanism 40. The operator may then remove the stack from the delivery hopper 26 without interfering with or being struck on the hand by cards being ejected from the conditioning unit 100 in rapid succession.

Experience has shown that the above described arrangement is both reliable and accurate. It is capable of handling 300 or more standard punched cards per minute while rejecting only those cards requiring removal of foreign objects affixed thereto or which are folded double when initially fed into the machine. The cards may have varying lengths, in fact, a mixture of short and long cards may be placed into the supply hopper. Still, only those cards which are not defective will pass through the machine to the delivery hopper, and those cards which are defective will be routed to the reject hopper, regardless of how many good cards or bad cards are fed in succession.

We claim as our invention:

1. In a card handling machine through which a series of cards are moved successively along a predetermined path, a control system comprising, in combination, a detector in said path and responsive to portions of excessive thickness in cards passed therethrough, a diverter spaced along said path beyond said detecting means and selectively operable to divert cards from said path; first, second and third switch means spaced successively along said path between said detecting and diverting means for sensing the presence of a card opposite them; a relay; means responsive to momentary actuation of said detecting means for energizing said relay; means including said second and third switch means for sealing in said relay until the second switch means is actuated while the third switch means is deactuated; means for operating said diverting means only if said relay is energized and a card is not being sensed by said first switch means; and means responsive to subsequent actuation of said first switch means for holding said diverter operated independently of said relay for so long as the first switch means remains actuated.

2. In a machine through which a plurality of business cards are passed in rapid succession along a predetermined path, a control system for segregating defective cards comprising, in combination, a defective card detector and a card diverter spaced apart along the card path; first, second, and third card sensing means located between said detector and diverter and spaced apart in the order named along the card path; a control relay; means responsive to actuation of said detector for picking up said relay; means including said second and third sensing means for sealing in said relay until said second sensing means is actuated and said third sensing means is at the same time deactuated; means responsive to pickup of said relay and deactuation of said first sensing means for operating said diverter; means responsive to actuation of said first sensing means for holding said diverter actuated and isolating the latter from said relay; and means responsive to the actuation of said second sensing means while said third sensing means is deactuated for de-energizing said relay.

3. In a machine through which a plurality of business cards are passed in rapid succession along a predetermined path, a control system for segregating defective cards comprising, in combination, a defective card detector and a card diverter spaced in the order named along the card path, a storage device and means for conditioning the storage device in response to momentary actuation of said detector, a first card sensing device spaced between said detector and diverter and means for operating the latter when the storage device is conditioned and the first sensing device is de-actuated, means for maintaining said diverter operated independently of said storage device when said first sensing device is actuated, a second card sensing device located on the card path between said first device and diverter, means responsive to actuation of said second device for restoring said storage device, a third card sensing device located on the card path between said second device and diverter, and means for causing said third device when actuated to maintain said storage device conditioned even though said second device is actuated.

4. In a machine through which a plurality of business cards are passed in succession along a predetermined path, a control system for segregating defective cards comprising, in combination, a defective card detector, card sensing means, and a card diverter spaced in the order named along said path, means for actuating said diverter in response to actuation of said detector if said sensing means are de-actuated to indicate the absence of a card, a storage device, means for conditioning said storage device in response to actuation of said detector, means for operating said diverter when said storage device is conditioned and said sensing means are deactuated, means for holding said diverter actuated independently of said storage device for so long as said sensing means are actuated, and means for restoring said storage device after said diverter has been operated.

5. In a card handling machine through which a series of cards are moved successively along a predetermined path, a control system comprising, in combination, a defective card detector and a card diverter spaced apart in the order named along said card path; first, second, and third means spaced successively along said path between said detector and diverter for sensing the presence of a card; means responsive to actuation of said detector for actuating said diverter only if a card is not being sensed by said first means; means controlled by said first, second, and third means and by said detector for actuating said diverter in response to actuation of said detector only after clearance of a preceding card past said first means; and means controlled by said first sensing means for sealing in said diverting means for so long as a card previously detected by said detecting means is being sensed by said first means; whereby said diverting means is actuated only during the passage of defective cards thereby.

6. In a card handling machine through which a series of cards are moved successively along a predetermined path, a control system comprising, in combination, means for detecting the presence of defective cards during their travel along said path; means spaced along said path beyond said detecting means and selectively operable to divert cards from said path; first, second, and third means spaced successively along said path between said detecting and diverting means for sensing the presence of a card; a storage device; means responsive to actuation of said detecting means by a defective card for conditioning said storage device; means for operating said diverting means only if said storage device is conditioned and after the preceding card has cleared said first means; means for maintaining said diverting means operated for so long as a card previously detected by said detecting means is passing said first sensing means; and means including said second and third sensing means for holding said storage device conditioned after the actuation of said detecting means until said second means is next actuated; whereby said diverting means is actuated only upon the passage of defective cards thereby.

7. In a card handling machine in which a series of cards are moved successively along a predetermined path, a control system comprising, in combination, a defective card detector located on said path; a diverter spaced along said path beyond said detector and selectively operable to divert cards from said path; means spaced along said path between said detector and diverter for sensing the presence of a card, means responsive to actuation of said detector for momentarily actuating said diverter only if a card is not being sensed by said sensing means; and means for maintaining said diverter actuated after said momentary actuation only while said sensing means are actuated.

8. In a card handling machine wherein a series of cards are passed successively along a predetermined path, the combination comprising a supply hopper for accommodating a stack of cards, an oscillating lever pivotally mounted adjacent the bottom of said stack, a rotating feed roller mounted on the end of said lever and movable upon oscillation of said lever into frictional engagement with the bottom card of said stack, means for rotating said roller in a direction to propel said cards one at a time along said path, means movable into the path of said lever to abut against said lever and block engagement of said roller with the cards thereby effectively disabling the operation of said feed roller, means for detecting the depletion of cards in said supply hopper, and means responsive to said detecting means for shifting said movable means into abutting engagement with said lever so that feeding of the cards is stopped.

9. In a card handling machine through which a series of cards are moved successively along a predetermined path, a control system comprising, in combination, means located along said path for detecting defects in the cards as they pass thereby, said detecting means being actuated and deactuated respectively according to whether a defective portion of a card is present at or absent from such means, means spaced along said path beyond said detecting means and selectively actuatable to divert passing cards from said path, means disposed along said path between said detecting means and said diverting means for sensing the presence of a card between the detecting and diverting means, said sensing means being actuated or deactuated respectively according to whether any part of a card is present at or absent from such means, means responsive to simultaneous actuation of said detecting means and deactuation of said sensing means for actuacting said diverting means, means for storing momentary actuation of said detecting means even though said sensing means are at that instant actuated, and means for actuating said diverting means in response to a subsequent deactuation of said sensing means after operation of said storing means and even though said detecting means are at that time deactuated.

10. In a card handling machine through which a series of cards are moved successively along a predetermined path, a control system comprising, in combination, means for detecting small areas of excessive thickness of cards passed therethrough, said detecting means being actuated and deactuated respectively according to whether an area of excessive thickness of a card is present at or absent from such means, means spaced along said path beyond said detecting means and selectively operable to divert passing cards from said path, card presence sensing means spaced along said path between said detecting and diverting means, said sensing means being actuated or deactuated respectively according to whether any part of a card is present at or absent from such means, first means for actuating said diverting means in response to simultaneous actuation of said detecting means and deactuation of said sensing means, second means for actuating said diverting means in response to sequential actuation of said detecting means and deactuation of said sensing means, and means controlled by said sensing means for maintaining said diverting means actuated until the sensing means are deactuated a second time.

11. In a card handling machine through which a series of cards are passed successively, the combination comprising a supply hopper adapted to receive a stack of cards, a rotating feed roller, means for oscillating said roller repeatedly against the bottom of said stack for propelling said cards one at a time into said machine, means for moving said cards through said machine, means for performing operations on said cards as they are moved through the machine, a single motive power means and connections therefrom for driving said roller, said oscillating means, said moving means, and said operating means; a delivery hopper in which cards passed through said machine are collected, means for detecting the presence of more than a predetermined number of cards in said delivery hopper, and means effective so long as said detecting means are actuated for interrupting the driving connection from said power means to said oscillating means, so that feeding of cards from said supply hopper is terminated before the delivery hopper is over-filled and is resumed immediately upon removal of some cards from the delivery hopper.

References Cited in the file of this patent

UNITED STATES PATENTS

| | | |
|---|---|---|
| 1,732,426 | Zahn et al. | Oct. 22, 1929 |
| 1,835,382 | Cunningham | Dec. 8, 1931 |
| 2,093,573 | Page | Sept. 21, 1937 |
| 2,234,456 | Schaurte et al. | Mar. 11, 1941 |
| 2,312,357 | Odquist | Mar. 2, 1943 |
| 2,358,051 | Broido | Sept. 12, 1944 |
| 2,393,614 | Curtis | Jan. 29, 1946 |
| 2,433,685 | Dowell | Dec. 30, 1947 |
| 2,783,882 | Griffin et al. | Mar. 5, 1957 |